United States Patent
Someya

(10) Patent No.: US 10,839,553 B2
(45) Date of Patent: Nov. 17, 2020

(54) IMAGE PROCESSING APPARATUS AND METHOD

(71) Applicant: SONY CORPORATION, Tokyo (JP)

(72) Inventor: Kiyoto Someya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 119 days.

(21) Appl. No.: 16/086,633

(22) PCT Filed: Mar. 14, 2017

(86) PCT No.: PCT/JP2017/010110
§ 371 (c)(1),
(2) Date: Sep. 20, 2018

(87) PCT Pub. No.: WO2017/169726
PCT Pub. Date: Oct. 5, 2017

(65) Prior Publication Data
US 2019/0102907 A1    Apr. 4, 2019

(30) Foreign Application Priority Data
Mar. 28, 2016   (JP) ................................ 2016-064244

(51) Int. Cl.
*G06T 7/73* (2017.01)
*G03B 17/54* (2006.01)
(Continued)

(52) U.S. Cl.
CPC ................ *G06T 7/74* (2017.01); *G03B 17/54* (2013.01); *G03B 21/142* (2013.01);
(Continued)

(58) Field of Classification Search
CPC ... G06T 7/74; G06T 7/73; G06T 2207/30208; G06F 3/1446; G06K 9/00624;
(Continued)

(56) References Cited

U.S. PATENT DOCUMENTS

| | | | |
|---|---|---|---|
| 2006/0158623 A1 | 7/2006 | Kobayashi et al. | |
| 2013/0244733 A1 | 9/2013 | Ueno et al. | |
| 2014/0321703 A1* | 10/2014 | Inomata | G06T 7/33 382/103 |

FOREIGN PATENT DOCUMENTS

| | | |
|---|---|---|
| JP | 2003-259252 A | 9/2003 |
| JP | 2006-197443 A | 7/2006 |

(Continued)

OTHER PUBLICATIONS

International Search Report and Written Opinion of PCT Application No. PCT/JP2017/010110, dated Jun. 6, 2017, 11 pages of ISRWO.

*Primary Examiner* — Chuong A Ngo
(74) *Attorney, Agent, or Firm* — Chip Law Group

(57) ABSTRACT

A camera captures a projection image projected from a projector and generates a captured image and a disturbance detection section detects a disturbance of the projector by using the generated captured image. A posture estimation section compares, when the disturbance is detected, posture information before and after a disturbance detection and a presenting position update section performs an update of a presenting position on only the projector in which there is a change in the compared posture information before and after the disturbance detection.

12 Claims, 10 Drawing Sheets

(51) Int. Cl.
*G09G 3/00* (2006.01)
*H04N 5/74* (2006.01)
*G06F 3/14* (2006.01)
*G03B 21/14* (2006.01)
*G06K 9/00* (2006.01)
*G06K 9/62* (2006.01)

(52) U.S. Cl.
CPC ....... *G06F 3/1446* (2013.01); *G06K 9/00624* (2013.01); *G06K 9/6202* (2013.01); *G06T 7/73* (2017.01); *G09G 3/001* (2013.01); *H04N 5/74* (2013.01); *G03B 2206/00* (2013.01); *G06T 2207/30208* (2013.01); *G09G 2300/026* (2013.01); *G09G 2320/0693* (2013.01); *G09G 2330/12* (2013.01)

(58) Field of Classification Search
CPC ............. G06K 9/6202; G09G 2330/12; G09G 2300/026; G09G 2320/0693; G09G 5/38; G09G 3/001; G03B 2206/00; G03B 17/54; G03B 21/142; H04N 9/3185; H04N 9/3194; H04N 9/3147; H04N 5/74
See application file for complete search history.

(56) References Cited

FOREIGN PATENT DOCUMENTS

| | | |
|---|---|---|
| JP | 2008-249906 A | 10/2008 |
| JP | 2009-135921 A | 6/2009 |
| JP | 2009-224929 A | 10/2009 |
| JP | 2012-114863 A | 6/2012 |
| JP | 2013-195498 A | 9/2013 |
| WO | 2012/070503 A1 | 5/2012 |

* cited by examiner

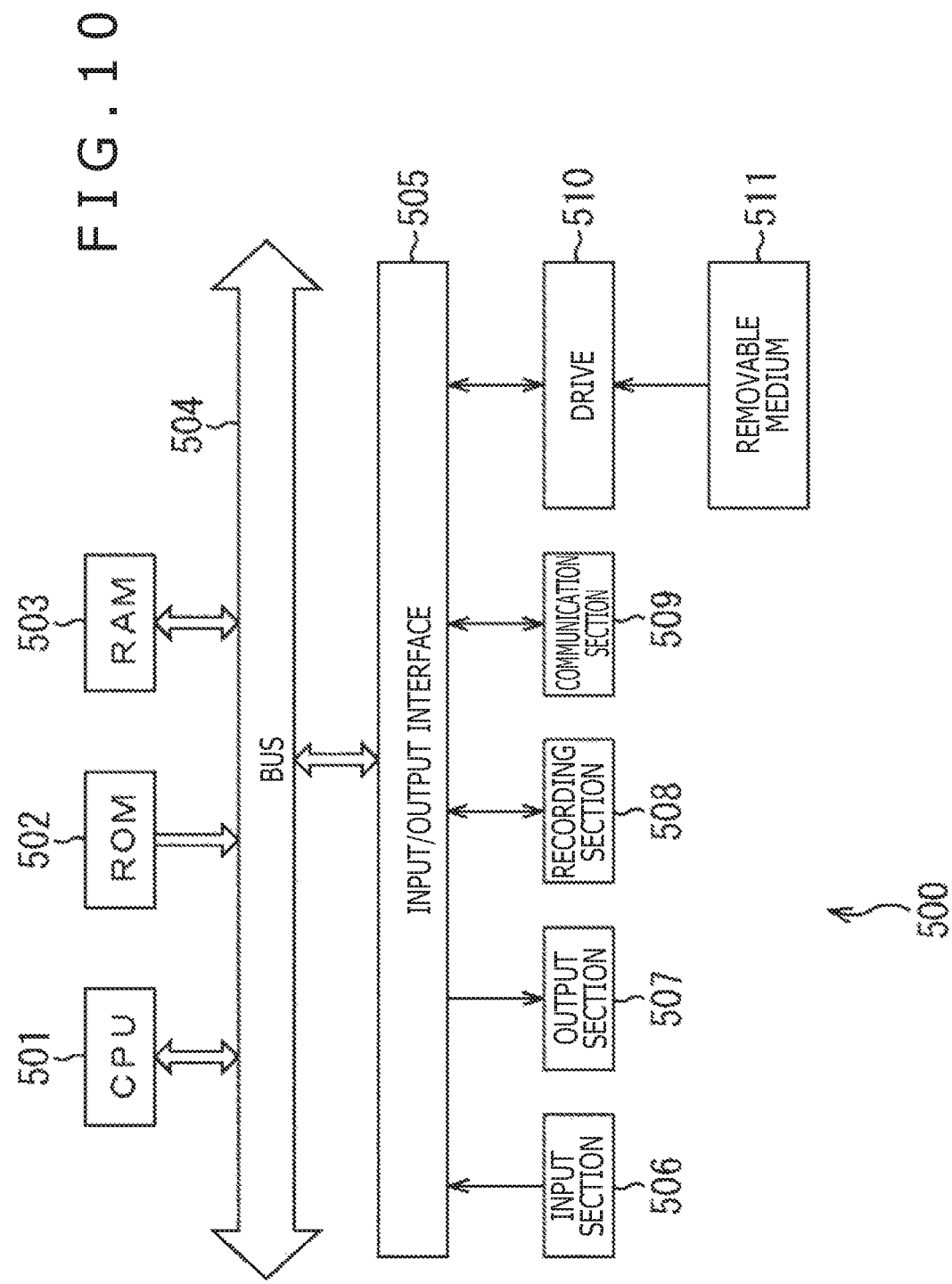

IMAGE PROCESSING APPARATUS AND METHOD

CROSS REFERENCE TO RELATED APPLICATIONS

This application is a U.S. National Phase of International Patent Application No. PCT/JP2017/010110 filed on Mar. 14, 2017, which claims priority benefit of Japanese Patent Application No. JP 2016-064244 filed in the Japan Patent Office on Mar. 28, 2016. Each of the above-referenced applications is hereby incorporated herein by reference in its entirety.

TECHNICAL FIELD

The present disclosure relates to an image processing apparatus and a method, and more particularly to an image processing apparatus and a method that are aimed at enabling a comfortable viewing experience to be provided.

BACKGROUND ART

When a disturbance occurs at the time of projecting a video content by using projectors, it is necessary to update a position in which the video content is presented on a screen surface. The term disturbance here means the fact that a user changes an arrangement of the projectors or increases/decreases the projectors to be used, a posture deviation due to an unintended physical contact to the projectors, a delicate posture deviation due to a temperature characteristic or a change with time, and the like. Since a posture of the projector is changed by the disturbance, a distortion (a trapezoidal distortion, a deviation of blending, or the like) occurs on the projected video content. Therefore, it is necessary to re-estimate the posture of the projector and update a presenting position of the video content so that a distortion does not occur on the projected video content.

In order to estimate the posture of the projector (and a camera), it is necessary to find out a corresponding point between the projector (projection image) and the camera (captured image).

For example, online sensing that is a technique for finding out the corresponding point while projecting an image such as content is capable of detecting the corresponding point in the act of projecting an input video. Therefore, even if the posture of the projector is changed by the disturbance, it is possible to automatically update the input video on a correct video presenting position (see Patent Literature 1).

CITATION LIST

Patent Literature

PTL 1

JP 2009-135921A

SUMMARY

Technical Problem

However, while the video is presented as it is, the posture of the projector is estimated and the presenting position of the video is updated. Therefore, when the video presenting position is largely changed before and after the sensing or the like, it is hard to say that a comfortable viewing experience is provided. Further, there is the possibility that when a wide-angle view video is projected on a large-sized screen, video sickness is caused.

The present disclosure has been made in view of the above-described circumstances to be capable of providing the comfortable viewing experience.

Solution to Problem

An image processing apparatus according to an aspect of the present technology includes: a disturbance detection section configured to detect a disturbance of a projector by using a captured image generated by capturing a projection image projected from the projector; and a presenting position update section configured to compare posture information before and after a disturbance detection and perform an update of a presenting position on only the projector in which there is a change in the posture information before and after the disturbance detection when the disturbance is detected by the disturbance detection section.

The image processing apparatus can further include an image-capturing section configured to capture the projection image projected from the projector and generate the captured image.

The presenting position update section can perform an update of the presenting position on only the projector in which there is the change in the posture information before and after the disturbance detection when there is no change in the posture information regarding a plurality of projectors and a change in the presenting position before and after the disturbance detection is small.

The image processing apparatus can further include a scene change determination section configured to determine whether or not there is a scene change in an input video, in which when it is determined by the scene change determination section that there is the scene change, the presenting position update section can perform the update of the presenting position around the scene change.

The scene change determination section can determine whether or not there is the scene change in an input video when there is a change in the posture information regarding the plurality of projectors or when there is no change in the posture information regarding the plurality of projectors but the change in the presenting position before and after the disturbance detection is large.

The image processing apparatus can further include a presenting position change determination section configured to determine whether or not the change in the presenting position before and after the disturbance detection is large when it is determined by the scene change determination section that there is the scene change, in which when it is determined by the presenting position change determination section that the change in the presenting position before and after the disturbance detection is large, the presenting position update section can perform the update of the presenting position applying an effect before and after the scene change.

When it is determined by the presenting position change determination section that the change in the presenting position before and after the disturbance detection is small, the presenting position update section can perform the update of the presenting position in the scene change.

When it is determined by the scene change determination section that there is no scene change, the presenting position update section can perform a notification to a user in advance and perform the update of the presenting position.

The presenting position update section can perform the update of the presenting position applying the effect.

The image processing apparatus can further include a presenting position change determination section configured to determine a degree of a change in the presenting position after the disturbance detection, in which the presenting position update section can perform the update of the presenting position applying the effect in accordance with the degree of the change in the presenting position.

The disturbance of the projector includes an arrange change of the projector, an increase/decrease in the number of the projectors, a posture deviation due to a physical contact to the projector, and a posture deviation due to a temperature characteristic or a change with time.

An image processing method according to an aspect of the present technology includes: by an image processing apparatus, detecting a disturbance of a projector by using a captured image generated by capturing a projection image projected from the projector; and comparing posture information before and after a disturbance detection and performing an update of a presenting position on only the projector in which there is a change in the posture information before and after the disturbance detection when the disturbance is detected.

In accordance with an aspect of the present technology, a disturbance of a projector is detected by using a captured image generated by capturing a projection image projected from the projector; and posture information before and after a disturbance detection is compared and an update of a presenting position is performed on only the projector in which there is a change in the posture information before and after the disturbance detection when the disturbance is detected.

Advantageous Effects of Invention

According to an aspect of the present technology, it is possible to provide a comfortable viewing experience.

Note that the effects described in the present specification are merely illustrative, the effects of the present technology are not limited to the effects described in the present specification, and additional effects may be provided.

BRIEF DESCRIPTION OF DRAWINGS

FIG. 10 is a block diagram illustrating a hardware configuration example of a computer to which the present technology is applied.

DESCRIPTION OF EMBODIMENTS

Hereinafter, modes for carrying out the present disclosure (hereinafter, referred to as embodiments) will be described.
<Background>

When a disturbance occurs at the time when a video content is projected by using projectors, a position in which the video content is presented to a screen surface needs to be updated. The term disturbance here means the fact that a user changes an arrangement of the projectors or increases/decreases the projectors to be used, a posture deviation due to an unintended physical contact to the projectors, a delicate posture deviation due to a temperature characteristic or a change with time, or the like. Since a posture of the projector is changed by the disturbance, a distortion (a trapezoidal distortion, a deviation of blending, or the like) occurs on the projected video content. Therefore, it is necessary to re-estimate the posture of the projector and update a presenting position of the video content so that a distortion does not occur on the projected video content.

Figure 1:
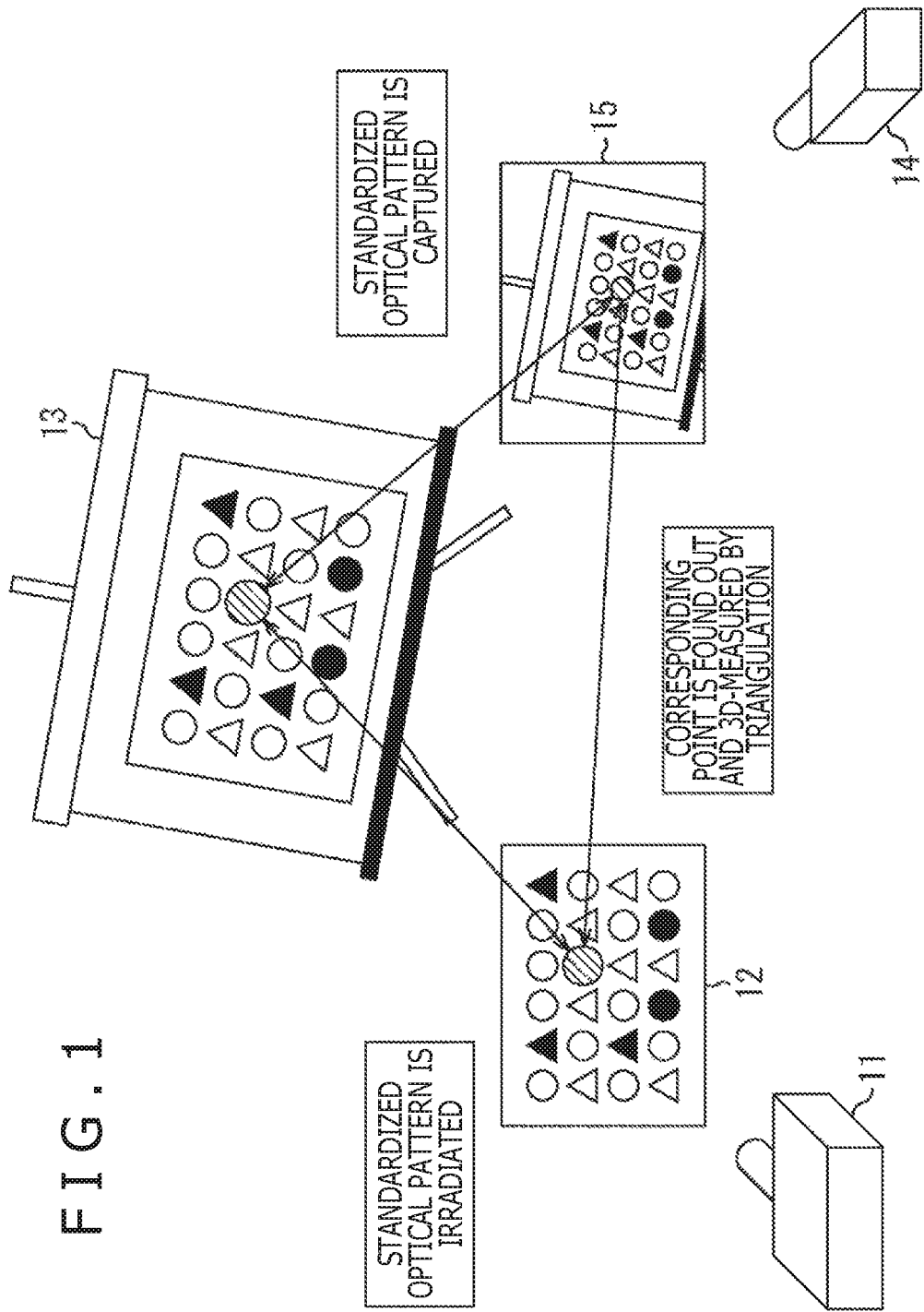
FIG. 1 is a diagram illustrating an example of an appearance of a detection of a corresponding point.

As an example illustrated in FIG. 1, for example, the following method is used. More specifically, a standardized light pattern 12 of a predetermined picture is projected on a screen 13 from a projector 11 and the projected standardized light pattern 12 is captured by using a camera 14 to obtain a captured image 15. Further, a corresponding point between the standardized light pattern 12 and the captured image 15 is found out on the basis of the picture of the standardized light pattern 12, postures (positional relationship) of the projector 11 and the camera 14, a shape of the screen 13, and the like are found out by using triangulation etc. on the basis of the corresponding point, and a geometric correction is performed on the basis of the results.

When the geometric correction is performed by using the camera as described above, the corresponding point (pixels corresponding to the same position on a projection plane of both a projection image and the captured image) needs to be found out between the projection image (even an image to be projected may be used) and the captured image. Specifically, a correspondence relation between a pixel of the camera 14 (captured image 15) and a pixel of the projector 11 (standardized light pattern 12) needs to be found out. Detection processing of the corresponding point is generally referred to as structured light.

A method for projecting a pattern image of a gray code, a dot, a checker, or the like by using the projector and capturing the pattern image by using the camera to detect the corresponding point is assumed to be referred to as offline sensing. When the posture of the projector is estimated by the offline sensing after detecting the disturbance, a projection of the video content is stopped once and the pattern image is projected. Therefore, it is necessary to interrupt video viewing and it is difficult to provide a comfortable viewing experience.

On the other hand, a method in which while projecting a moving image the corresponding point is detected and postures of the projector and the camera are estimated is assumed to be referred to as the offline sensing. Examples of the corresponding point detection in the online sensing include Imperceptible Structured Light in which patterns that are not perceived by human's eyes in a moving image are superimposed on each other to detect the corresponding point (FIG. 2) and a method in which characteristic points are detected in the moving image and both the characteristic points are associated with each other (FIG. 3), and the like.

An ISL system is a technique in which a structured optical pattern that is an image having a predetermined pattern is positive/negative-inverted to be embedded to a projected image and is projected so as not to be perceived by a human being.

Figure 2:
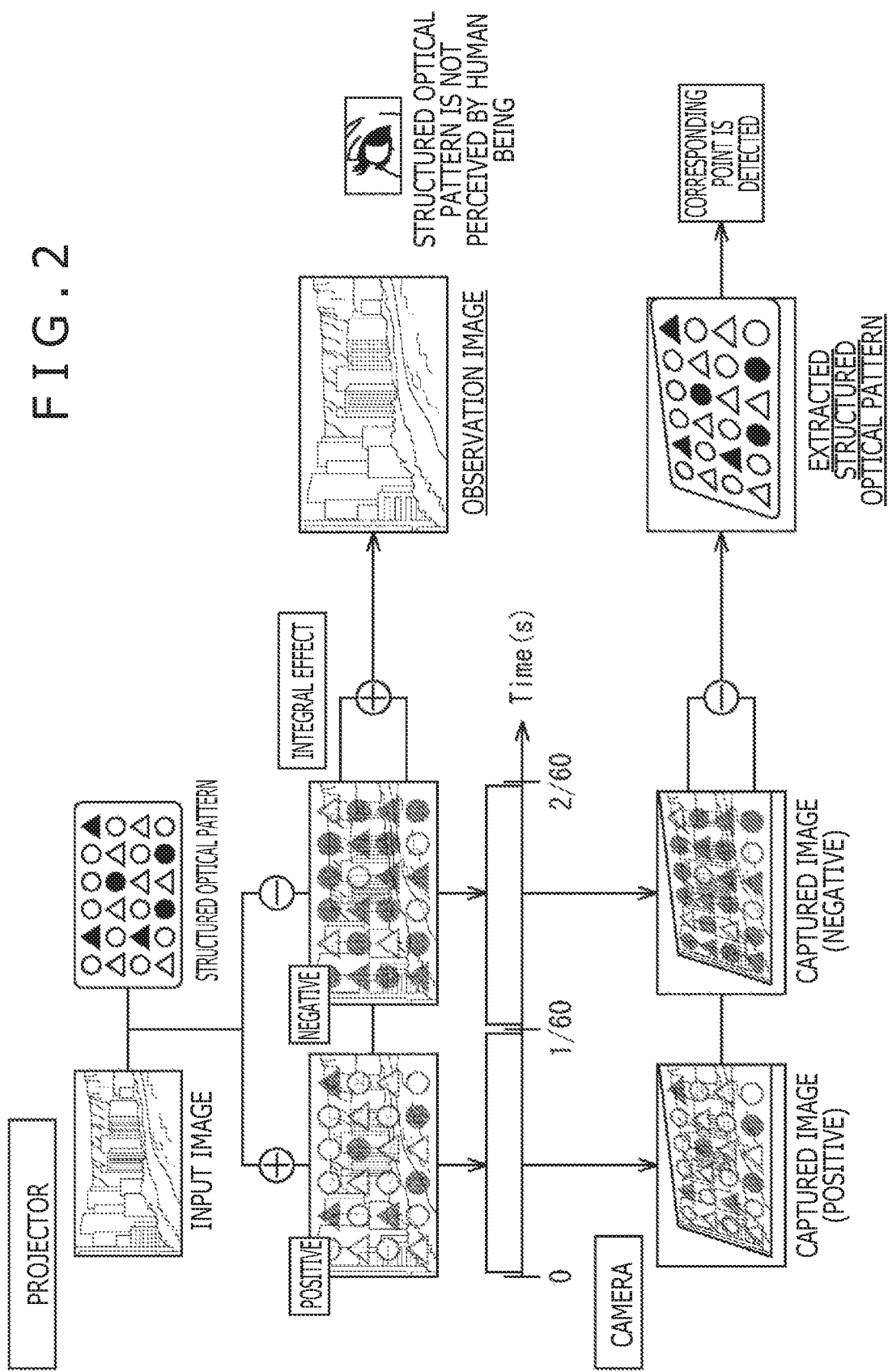
FIG. 2 is a diagram describing an example of an ISL.

As illustrated in FIG. 2, the projector adds the predetermined structured optical pattern to a frame of an input image to thereby generate a frame image obtained by synthesizing a positive image of the structured optical pattern to the input image. Further, the projector subtracts the structured optical pattern from the next frame of the input image to thereby generate a frame image obtained by synthesizing a negative image of the structured optical pattern to the input image. Then, the projector performs a continuous projection of their frames. Two positive and negative frames switched at high speed are added to be perceived to human eyes on the basis of an integral effect. In the result, it is difficult for the user who views the projection image to recognize the structured optical pattern embedded in the input image.

By contrast, the camera captures a projection image of their frames and finds out a difference between captured images of both the frames to thereby extract only the structured optical pattern included in the captured image. Detection of the corresponding points is performed by using the extracted structured optical pattern.

As described above, in the ISL system, a difference between the captured images is found out only to thereby extract the structured pattern easily. Therefore, it is possible to perform the detection of the corresponding point with steady accuracy without depending on the projected image.

Figure 3:
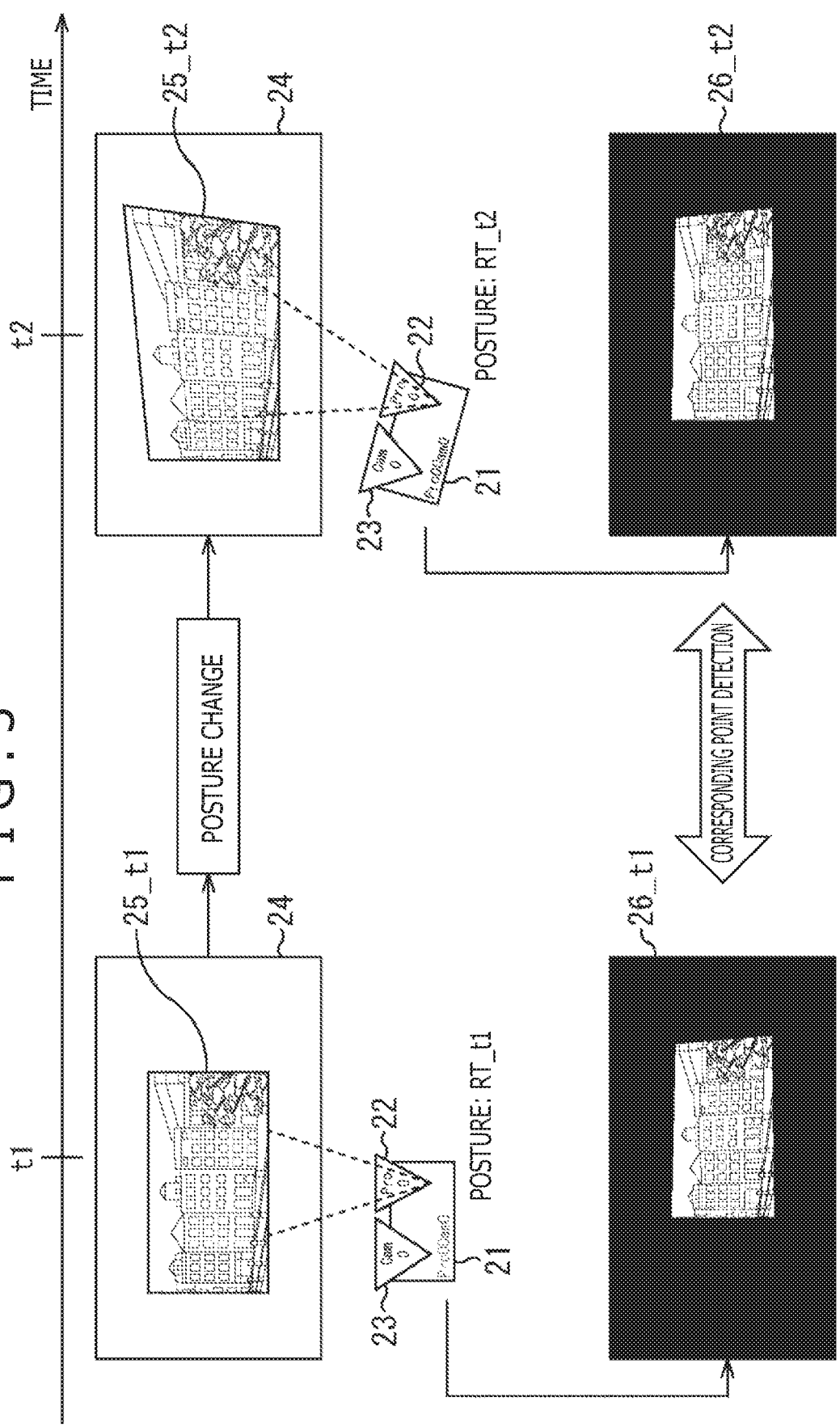
FIG. 3 is a diagram describing a method for associating characteristic points with each other in moving images.

As illustrated in FIG. 3, there is used even a method in which the characteristic point is detected in the moving image and both the characteristic points are associated with each other. At the time t1, the projector (projecting section) 22 and the camera (image-capturing section) 23 of a projection image-capturing apparatus 21 each have a posture RT_t1. At this time, the projector 22 projects a projection image 25_t1 on the screen 24 and the camera 23 captures the projection image 25_t1 to generate a captured image 26_t1.

Afterwards, at the time t2, a posture change is caused in the projector (projecting section) 22 and the camera (image-capturing section) 23 of the projection image-capturing apparatus 21. Further, the projector (projecting section) 22 and the camera (image-capturing section) 23 of the projection image-capturing apparatus 21 each have a posture RT_t2. At this time, the projector 22 projects a projection image 25_t2 on the screen 24 and the camera 23 captures the projection image 25_t2 to generate a captured image 26_t2.

As described above, the corresponding point is detected between the generated captured image 26_t1 at the time t1 and captured image 26_t2 at the time t2 in the act of projecting an input video. Therefore, even if the posture of the projector is changed by the disturbance, an advantage in which the input video can be automatically updated to a correct video presenting position is exerted (it is not necessary to project the above-described pattern image).

However, while the video is presented as it is, the posture of the projector is estimated and the presenting position of the video is updated. Therefore, when the video presenting position is largely changed before and after the posture of the projector and the shape of the screen are estimated (hereinafter, also referred to as sensing) or the like, it is hard to say that the comfortable viewing experience is provided. Further, there is the possibility that when a wide-angle view video is projected on a large-sized screen, video sickness is caused.

To solve the above problems, in the present technology, the video presenting position is suppressed from being rapidly changed before and after the sensing or video presentation timing is controlled. This process permits the comfortable viewing experience to be provided.

<Configuration Example of the Projection Image-Capturing Apparatus>

Figure 4:
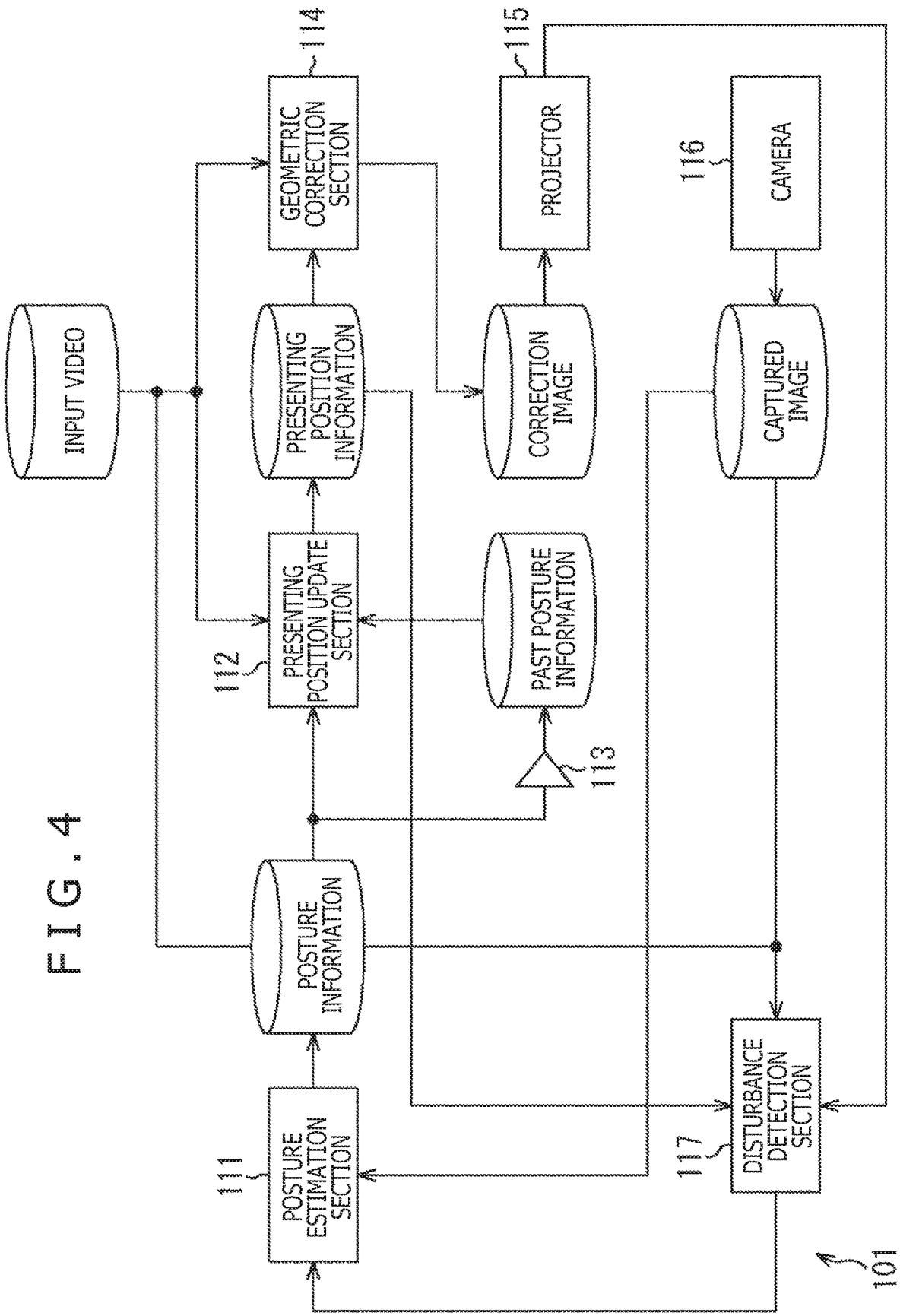
FIG. 4 is a block diagram illustrating a configuration example of a projection image-capturing apparatus to which the present technology is applied.

FIG. 4 is a block diagram illustrating a configuration example of the projection image-capturing apparatus to which the present technology is applied.

In an example illustrated in FIG. 4, the projection image-capturing apparatus 101 includes a posture estimation section 111, a presenting position update section 112, a delay section 113, a geometric correction section 114, a projector 115, a camera 116, and a disturbance detection section 117. The input video is input to the presenting position update section 112, the geometric correction section 114, and the disturbance detection section 117.

The posture estimation section 111 estimates an initial posture of the projector 115 and a shape of the screen. Note that an estimation method may be a method using the offline sensing (pattern projection) or a method using the online sensing. Further, the posture estimation section 111 provides the estimated posture information regarding the projector 115 and shape information regarding the screen for the presenting position update section 112, the delay section 113, and the disturbance detection section 117.

To the presenting position update section 112, the input video, the posture information regarding the projector 115 and the shape information regarding the screen, and past posture information from the delay section 113 are input. For example, the presenting position update section 112 finds out an initial video presenting position from the posture information regarding the projector 115 and the shape information regarding the screen and provides presenting position information that is the above information for the geometric correction section 114.

The geometric correction section 114 corrects the input video and generates the correction image so as to project the input video on the initial video presenting position and outputs the correction image to the projector 115. The projector 115 projects the correction image on the screen.

The camera 116 captures the projection image projected on the screen from the projector 115, generates the captured image, and provides the captured image for the disturbance detection section 117 and the posture estimation section 111.

Note that even the projector 115 and the camera 116 may be provided in plurality. Further, one camera 116 may be provided for one projector 115, one camera 116 may be provided for a plurality of projectors 115, or one projector 115 may be provided for a plurality of cameras 116.

The disturbance detection section 117 detects the disturbance by using the captured image from the camera 116. Further, the disturbance detection section 117 calculates an area (mask image) on which the input video is projected on the basis of the posture information and the presenting position information.

Figure 5:
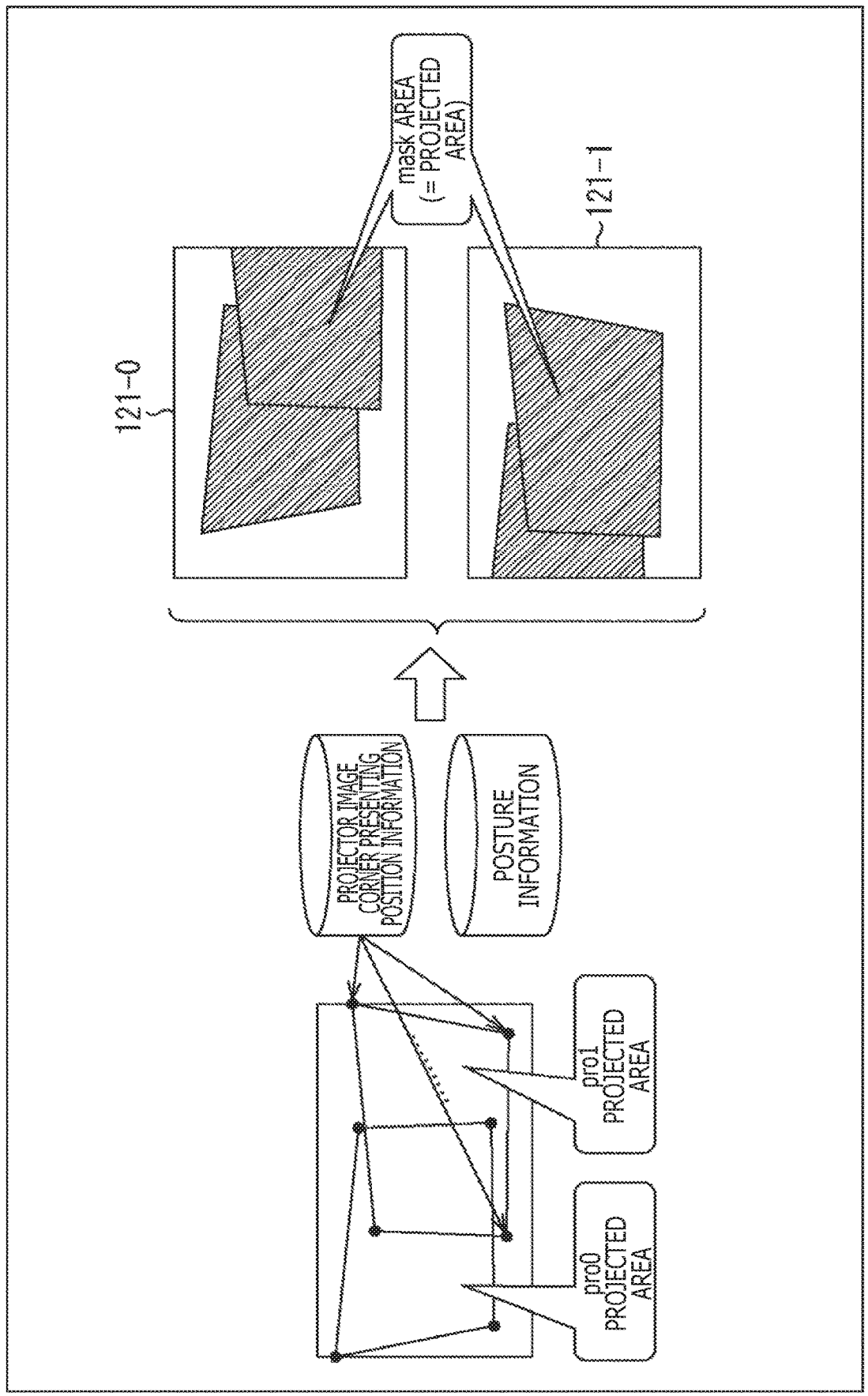
FIG. 5 is a diagram illustrating an example of an appearance of a disturbance detection.

For example, it is conceivable a case in which a projection is performed by a projector 115-0 and a projector 115-1 and a camera 116-0 and a camera 116-1 capture a projection image, respectively. In this case, as illustrated in FIG. 5, in the presenting position information, a projected area (pro0 projected area) of the projector 115-0 and a projected area (pro1 projected area) of the projector 115-1 are found out from the presenting position information regarding a projector image corner. Further, a mask image 121-0 of the camera 116-0 and a mask image 121-1 of the camera 116-1 in which a mask area (projected area) is indicated are found out from the respective posture information regarding the projectors 115-0 and 115-1.

Figure 6:
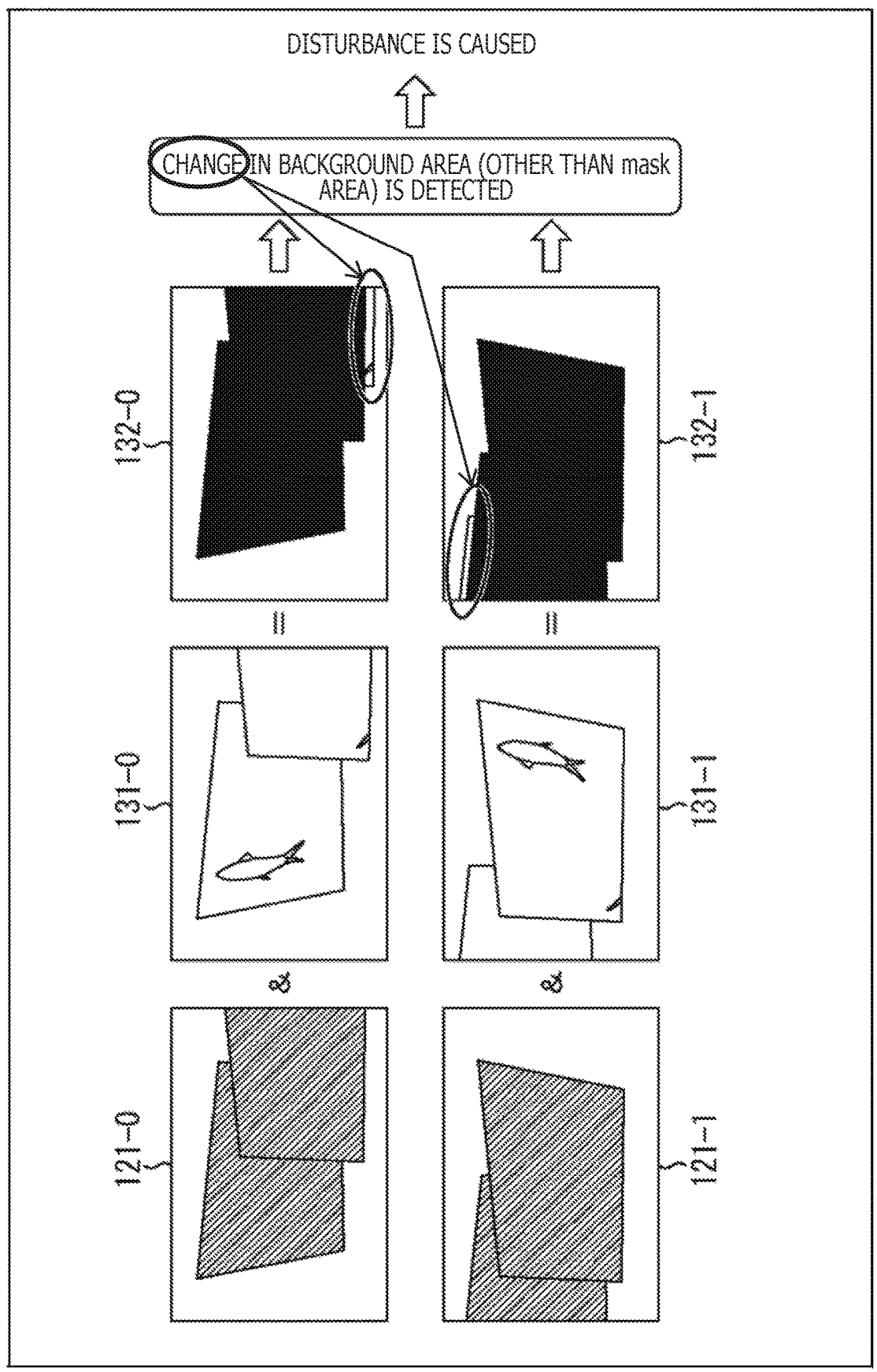
FIG. 6 is a diagram illustrating an example of an appearance of the disturbance detection.

Next, as illustrated in FIG. 6, the disturbance detection section 117 applies mask processing to the mask image 121-0 and the captured image 131-0, generates a mask processing image 132-0, and investigates whether or not there is a change in a background area (other than the mask area) of the mask processing image 132-0. Similarly, the disturbance detection section 117 applies mask processing to the mask image 121-1 and the captured image 131-1, generates a mask processing image 132-1, and investigates whether or not there is a change in the background area (other than the mask area) of the mask processing image 132-1.

In the case of an example illustrated in FIG. 6, since there is a change in a right under portion in the background area of the mask processing image 132-0, it is determined that the disturbance occurs. Further, since there is a change in a left upper portion in the background area of the mask processing image 132-1, it is determined that the disturbance occurs.

Further, when the disturbance does not occur, light (input video) of the projector does not shine on the background area of the projection image of the screen, and therefore there is no change. By contrast, when the disturbance occurs, light of the projector shines on the background area of the projection image of the screen, and therefore the disturbance detection section 117 detects the disturbance.

Figure 7:
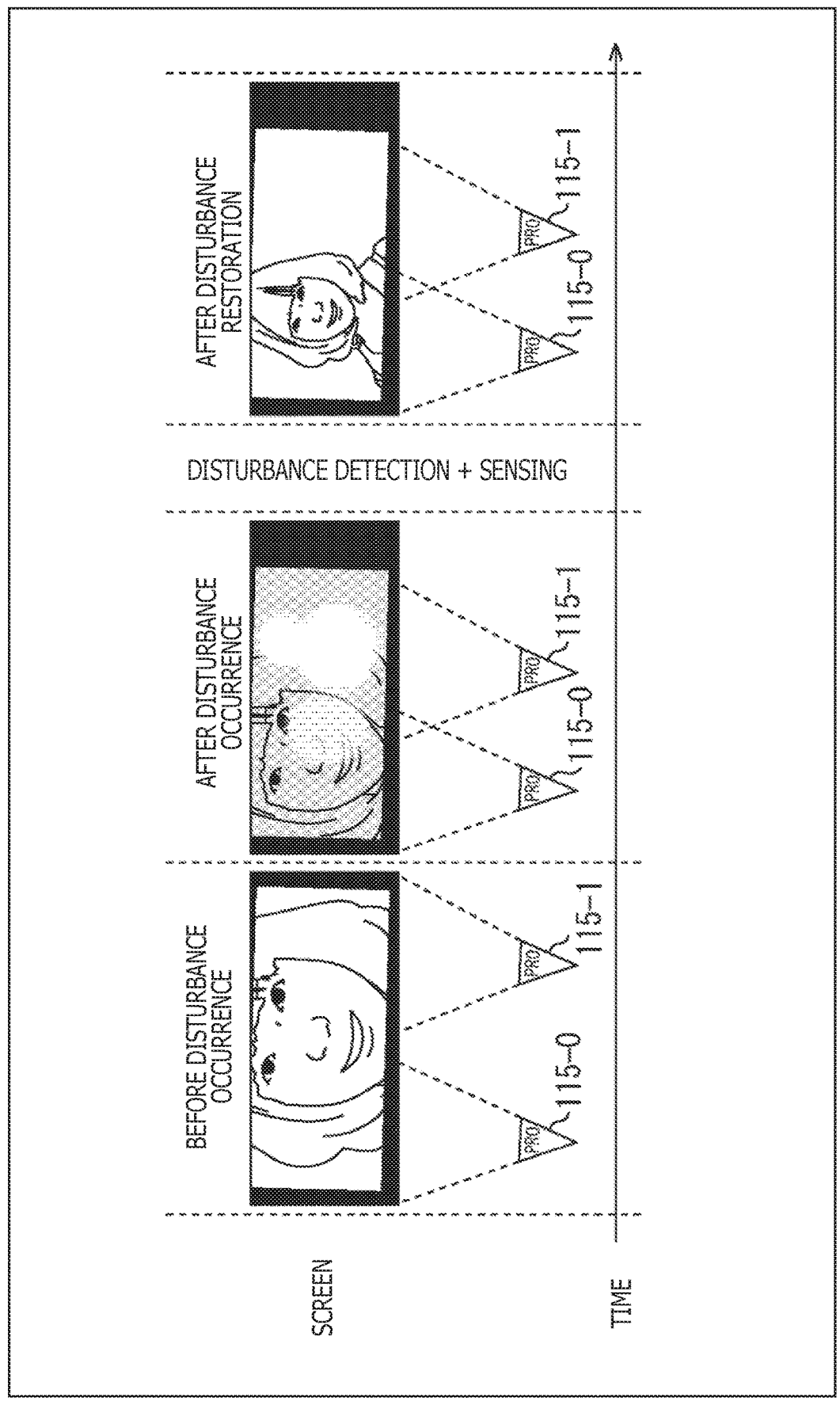
FIG. 7 is a diagram illustrating an example of an appearance of the disturbance detection.

Specifically, in an example illustrated in FIG. 7, light (input video) of the projectors 115-0 and 115-1 does not shine on the background area of the projection image of the screen 151 before the disturbance occurs. By contrast, light of the projector 115-1 shines on the background area of the projection image of the screen 151 after the disturbance occurs. The disturbance detection section 117 detects and senses the disturbance, and thereby the projection image in which the disturbance does not occur can be projected on the screen 151 after the disturbance is restored.

Hereinafter, operations of the presenting position update section 112 after detecting the disturbance will be described.

The disturbance detection section 117 notifies the posture estimation section 111 that the disturbance is detected. When the disturbance is detected, the posture estimation section 111 estimates the posture of the projector and the shape of the screen and provides the posture information and the screen shape information for the presenting position update section 112.

The presenting position update section 112 compares the posture information (past posture information) before the disturbance occurs and the posture information after the disturbance occurs and determines the presenting position information to be delivered to the geometric correction section 114. For example, when the input video is presented on the screen by using the plurality of projectors, the presenting position update section 112 updates the video presenting position of only the projector (that is, the projector the posture of which is changed) in which the disturbance occurs. That is, the video presenting position is maintained in the projector in which the disturbance does not occur.

Further, when the disturbances occur on multiple projectors and the video presenting positions are difficult to maintain, the presenting position update section 112 updates the presenting positions at the timing of a scene change of the input video. In addition, the presenting position update section 112 applies an effect (fade-out=>fade-in or the like) before and after the update of the presenting positions to thereby suppress a rapid change in the presenting positions. On this occasion, the degree of a change may be determined and the effect may be applied in accordance with the degree of the change. In addition, the presenting position update section 112 may notify the user of update timing of the presenting position in advance.

Figure 8:
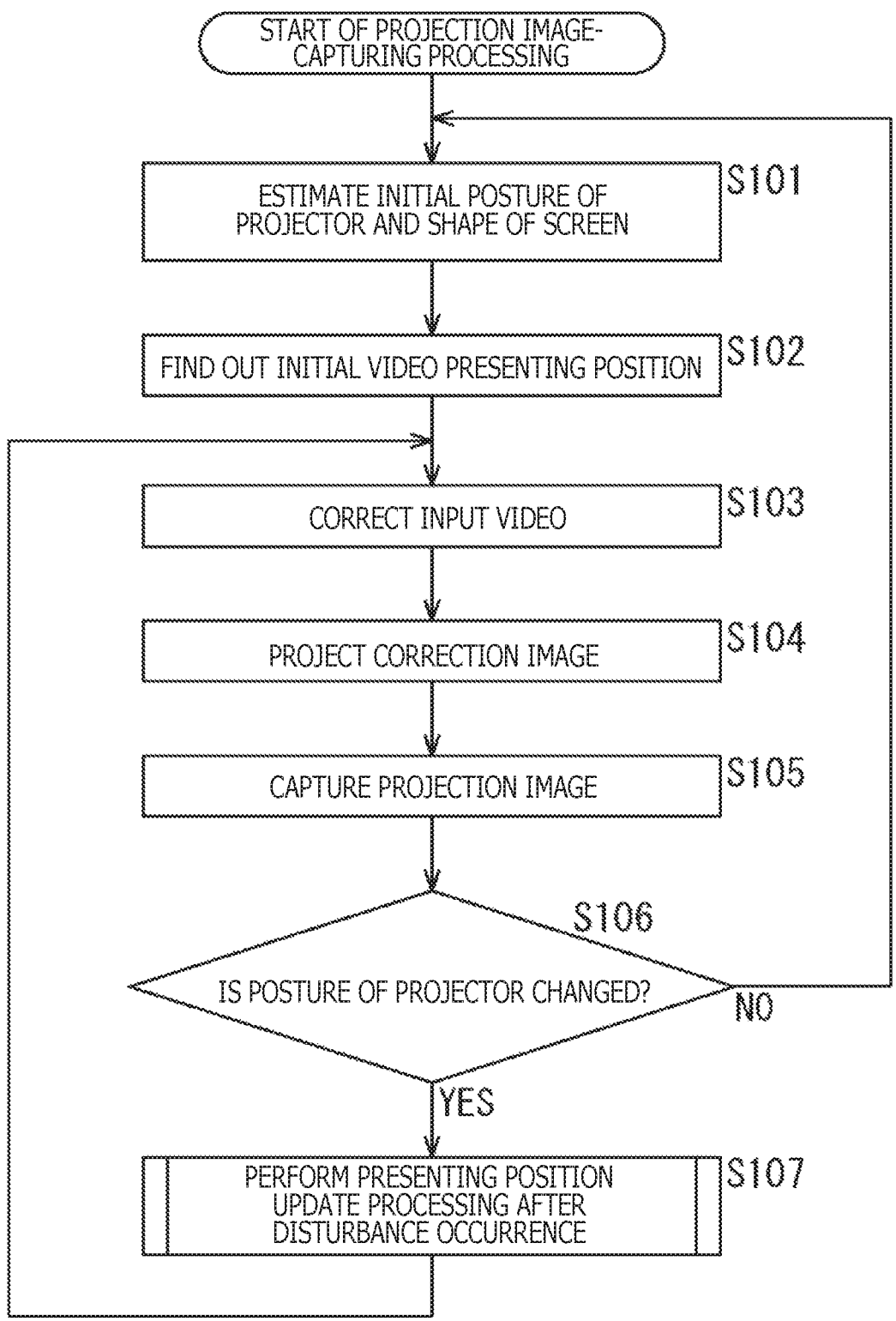
FIG. 8 is a flowchart describing projection image-capturing processing of the projection image-capturing apparatus.

Next, projection image-capturing processing of the projection image-capturing apparatus 101 will be described with reference to a flowchart illustrated in FIG. 8.

In step S101, the posture estimation section 111 estimates the initial posture of the projector 115 and the shape of the screen. The posture estimation section 111 provides the estimated posture information regarding the projector 115 and shape information regarding the screen for the presenting position update section 112, the delay section 113, and the disturbance detection section 117.

To the presenting position update section 112, the input video, the posture information regarding the projector 115 and the shape information regarding the screen, and the past posture information from the delay section 113 are input. In step S102, the presenting position update section 112 finds out the initial video presenting position from the posture information regarding the projector 115 and the shape information regarding the screen and provides the presenting position information that is the above information for the geometric correction section 114.

In step S103, the geometric correction section 114 corrects the input video so that the input video is projected on the initial video presenting position. Further, the geometric correction section 114 generates the correction image and outputs the correction image to the projector 115. In step S104, the projector 115 projects the correction image on the screen.

In step S105, the camera 116 captures the projection image projected on the screen from the projector 115, generates the captured image, and provides the captured image for the disturbance detection section 117 and the posture estimation section 111.

In step S106, the disturbance detection section 117 detects that the disturbance occurs as described above with reference to FIGS. 5 to 7 to thereby determine whether or not the posture of the projector is changed.

In step S106, if it is determined that the posture of the projector 115 is not changed, the process returns to step S101 and the subsequent processes are repeated. In step S106, if it is determined that the posture of the projector 115 is changed, the process proceeds to step S107.

In step S107, the projection image-capturing apparatus 101 performs disturbance occurrence postprocessing. Details of the disturbance occurrence processing will be described below with reference to FIG. 9. After the disturbance occurrence postprocessing in step S107, the process returns to step S103 and the subsequent processes are repeated.

Figure 9:
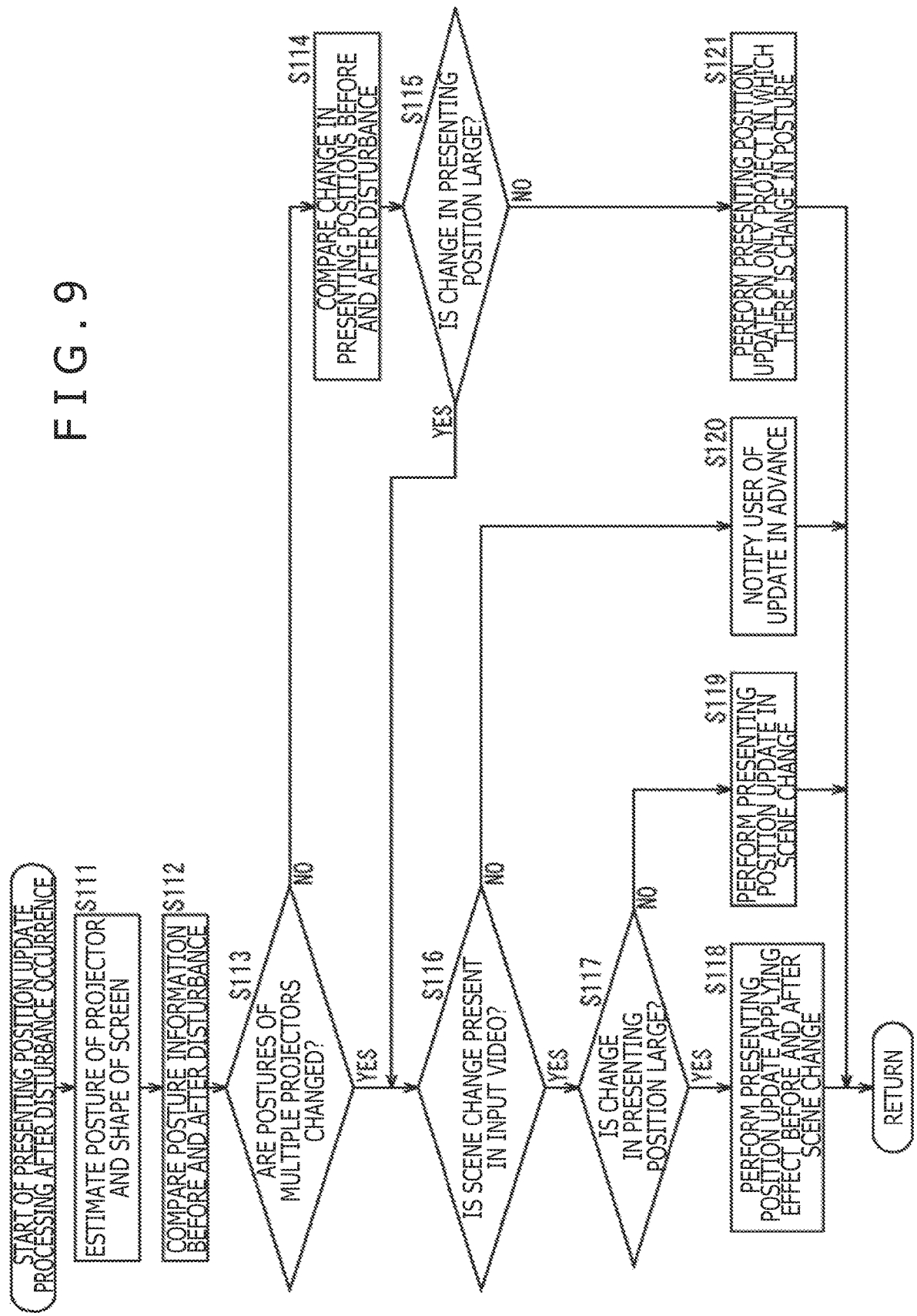
FIG. 9 is a flowchart describing presenting position update processing after a disturbance occurrence of step S107 illustrated in FIG. 8.

Next, the presenting position update processing after the disturbance occurrence of step S107 illustrated in FIG. 8 will be described with reference to a flowchart illustrated in FIG. 9.

The disturbance detection section 117 notifies the posture estimation section 111 that the disturbance is detected. In step S111, when the disturbance is detected, the posture estimation section 111 estimates the posture of the projector and the shape of the screen and provides the posture information and the screen shape information for the presenting position update section 112.

In step S112, the presenting position update section 112 compares the posture information (past posture information) before the disturbance occurrence and the posture information after the disturbance occurrence.

In step S113, the presenting position update section 112 determines whether or not the postures of the multiple projectors are changed. In step S113, if it is determined that the postures of the multiple projectors are not changed, the process proceeds to step S114. Note that in step S113, the multiple projectors are determined. On the occasion, a threshold may be provided and the posture change may be determined with the threshold or more set to be multiple. Further, it may be determined whether the posture of a single projector is changed or the postures of plural projectors are changed.

In step S114, the presenting position update section 112 compares a change in the presenting position before and after the disturbance occurrence and the process proceeds to step S115. In step S115, the presenting position update section 112 determines whether or not the change in the presenting position before and after the disturbance occurrence is large. In step S115, if it is determined that the change is large, the process proceeds to step S116.

On the other hand, in step S113, even if it is determined that the postures of the multiple projectors are changed, the process proceeds to step S116. In step S116, the presenting position update section 112 determines whether or not the scene change is present in the input video. In step S116, if it is determined that the scene change is present in the input video, the process proceeds to step S117.

In step S117, the presenting position update section 112 determines whether or not the change in the presenting position is large. In step S117, if it is determined that the change in the presenting position is large, the process proceeds to step S118. In step S118, the presenting position update section 112 performs an update of the presenting position while applying the effect before and after the scene change. After the update, the presenting position update processing ends and the process returns to step S107 illustrated in FIG. 8.

In step S117, if it is determined that the change in the presenting position is small, the process proceeds to step S119. In step S119, the presenting position update section 112 performs the update of the presenting position in the scene change. After the update, the presenting position update processing ends and the process returns to step S107 illustrated in FIG. 8.

In step S116, if it is determined that the scene change is not present in the input video, the process proceeds to step S120. In step 120, the presenting position update section 112 notifies the projector 115 or the user of the update in advance. After the notification, an illustration is not made and, for example, after consent of the user is obtained, the presenting position update processing is performed if necessary. After the update, the presenting position update processing ends and the process returns to step S107 illustrated in FIG. 8.

Further, in step S115, if it is determined that the change is small, the process proceeds to step S121. In step S121, the presenting position update section 112 performs the presenting position update processing on only the projector 115 in which there is the posture change. After the update, the presenting position update processing ends and the process returns to step S107 illustrated in FIG. 8.

As described above, according to the present technology, even if the posture of the projector deviates and a distortion occurs on a video by the disturbance in the act of projecting the video content on the screen, it is possible to automatically project a strain-free video on the screen surface and provide the comfortable viewing experience (without needing the pattern projection).

There is the possibility that in the video viewing using a large-sized screen, a wide-angle view screen, or the like, in particular, a rapid change in the video presenting position causes the video sickness. It is predicted that the effects of the present technology are large on the video sickness caused by the rapid change.

Note that in the descriptions, an example in which the disturbance detection is performed by using the camera is described. Further, even if a sensor (e.g., an acceleration sensor or a temperature sensor) other than the camera is used or the disturbance detection is used by sensor fusion, the present technology is applicable.

<Personal Computer>

The above-described series of processing may be executed by hardware or may be executed by software. If the series of processing is executed by software, programs that configure that software are installed into a computer. Here, the computer includes a computer incorporated in dedicated hardware, a general-purpose personal computer capable of executing various functions by installing various programs, and the like.

FIG. 10 is a block diagram illustrating a configuration example of hardware of a personal computer that executes the above-described series of processing in accordance with programs.

In a personal computer 500, a CPU (Central Processing Unit) 501, a ROM (Read Only Memory) 502, and a RAM (Random Access Memory) 503 are connected to one another through a bus 504.

An input/output interface 505 is further connected to the bus 504. An input section 506, an output section 507, a storage section 508, a communication section 509, and a drive 510 are connected to the input/output interface 505.

The input section 506 includes a keyboard, a mouse, a microphone, and the like. The output section 507 includes a display, a speaker, and the like. The storage section 508 includes a hard disk, a nonvolatile memory, and the like. The communication section 509 includes a network interface, and the like. The drive 510 drives a removable medium 511 such as a magnetic disk, an optical disk, a magneto-optical disk, or a semiconductor memory.

As described above, in the personal computer 500 to be configured, the CPU 501 loads programs stored in, for example, the storage section 508 into the RAM 503 via the input/output interface 505 and the bus 504 and executes the programs. With this, the above-described series of processing is performed.

The programs executed by the computer (CPU 501) can be stored in the removable medium 511 and provided. The removable medium 511 is, for example, a package medium or the like. The package medium includes a magnetic disk (including a flexible disk), an optical disk (CD-ROM (Compact Disc-Read Only Memory), DVD (Digital Versatile Disc), etc.), a magneto-optical disk, a semiconductor memory, and the like. Additionally or alternatively, the programs can be provided via a wired or wireless transmission medium such as a local area network, the Internet, and digital satellite broadcasting.

In the computer, the programs can be installed into the storage section 508 via the input/output interface 505 by the removable medium 511 being mounted on the drive 510. Further, the programs can be received by the communication section 509 via the wired or wireless transmission medium and installed into the storage section 508. In addition, the programs can be installed into the ROM 502 and the storage section 508 in advance.

Note that the programs executed by the computer may be programs to be processed chronologically in the order described in the present specification or may be programs to be processed concurrently or at necessary stages, for example, upon calling.

Further, in the present specification, steps describing the programs stored in a storage medium include, as a matter of course, processing to be performed chronologically in the order described and also include processing to be concurrently or individually executed without necessarily needing to be processed chronologically.

Further, in the present specification, the system refers to the entire apparatus constituted by a plurality of devices (apparatuses).

For example, the present disclosure can adopt a configuration of cloud computing which jointly processes one function in a shared manner by a plurality of apparatuses through a network.

Further, the configuration described above as a single apparatus (or processor) may be divided and may be configured as a plurality of apparatuses (or processors). By contrast, the configurations described above as a plurality of apparatuses (or processors) may be unified and configured as a single apparatus (or processor). Further, as a matter of course, a configuration other than those described above may be added to the configuration of each apparatus (or each processor). In addition, as long as the configuration and operation as the entire system are substantially the same, a portion of configuration of a certain apparatus (or processor) may be included in a configuration of another apparatus (or another processor). That is, the present technology is not limited to the above-described embodiments and various modifications can be made without departing from the gist of the present technology.

Although favorable embodiments of the present disclosure have been described in detail with reference to the attached drawings, the present disclosure is not limited to such an example. It is obvious that a person with ordinary skill in the art to which the present disclosure pertains can conceive various changed examples or modified examples within the range of the technical ideas described in the scope of claims and it should be understood that they also fall within the technical range of the present disclosure as a matter of course.

Note that the present technology can also take the following configurations.

(1)
An image processing apparatus including:
a disturbance detection section configured to detect a disturbance of a projector by using a captured image generated by capturing a projection image projected from the projector; and
a presenting position update section configured to compare posture information before and after a disturbance detection and perform an update of a presenting position on only the projector in which there is a change in the posture information before and after the disturbance detection when the disturbance is detected by the disturbance detection section.

(2)
The image processing apparatus according to (1) above, further including:
an image-capturing section configured to capture the projection image projected from the projector and generate the captured image.

(3)
The image processing apparatus according to (1) above, in which
the presenting position update section performs an update of the presenting position on only the projector in which there is the change in the posture information before and after the disturbance detection when there is no change in the posture information regarding a plurality of projectors and a change in the presenting position before and after the disturbance detection is small.

(4)
The image processing apparatus according to any one of (1) to (3) above, further including:
a scene change determination section configured to determine whether or not there is a scene change in an input video, in which
when it is determined by the scene change determination section that there is the scene change, the presenting position update section performs the update of the presenting position around the scene change.

(5)
The image processing apparatus according to (4) above, in which the scene change determination section determines whether or not there is the scene change in the input video when there is a change in the posture information regarding the plurality of projectors or when there is no change in the posture information regarding the plurality of projectors but the change in the presenting position before and after the disturbance detection is large.

(6)
The image processing apparatus according to (4) above, further including:
a presenting position change determination section configured to determine whether or not the change in the presenting position before and after the disturbance detection is large when it is determined by the scene change determination section that there is the scene change, in which
when it is determined by the presenting position change determination section that the change in the presenting position before and after the disturbance detection is large, the presenting position update section performs the update of the presenting position applying an effect before and after the scene change.

(7)
The image processing apparatus according to (6) above, in which when it is determined by the presenting position change determination section that the change in the presenting position before and after the disturbance detection is small, the presenting position update section performs the update of the presenting position in the scene change.

(8)
The image processing apparatus according to (3) above, in which when it is determined by the scene change determination section that there is no scene change, the presenting position update section performs a notification to a user in advance and performs the update of the presenting position.

(9)
The image processing apparatus according to (1) above, in which the presenting position update section performs the update of the presenting position applying an effect.

(10)
The image processing apparatus according to (9) above, further including:
a presenting position change determination section configured to determine a degree of a change in the presenting position after the disturbance detection, in which the presenting position update section performs the update of the presenting position applying the effect in accordance with the degree of the change in the presenting position.

(11)

The image processing apparatus according to any one of (1) to (10) above, in which the disturbance of the projector includes an arrange change of the projector, an increase/decrease in a number of the projectors, a posture deviation due to a physical contact to the projector, and a posture deviation due to a temperature characteristic or a change with time.

(12)

An image processing method including:

by an image processing apparatus, detecting a disturbance of a projector by using a captured image generated by capturing a projection image projected from the projector; and comparing posture information before and after a disturbance detection and performing an update of a presenting position on only the projector in which there is a change in the posture information before and after the disturbance detection when the disturbance is detected.

(13)

A program for causing a computer to function as:

a disturbance detection section configured to detect a disturbance of a projector by using a captured image generated by capturing a projection image projected from the projector; and a presenting position update section configured to compare posture information before and after a disturbance detection and perform an update of a presenting position on only the projector in which there is a change in the posture information before and after the disturbance detection when the disturbance is detected by the disturbance detection section.

REFERENCE SIGNS LIST

101 Projection image-capturing apparatus, 111 Posture estimation section, 112 Presenting position update section, 113 Delay section, 114 Geometric correction section, 115, 115-0, 115-1 Projector, 116, 116-0, 116-1 Camera, 117 Disturbance detection section, 151 Screen

The invention claimed is:

1. An image processing apparatus, comprising:
a disturbance detection section configured to detect a disturbance of a specific projector, based on a captured image generated by capture of a projection image projected from the specific projector;
a posture estimation section configured to generate first posture information of the specific projector and second posture information of the specific projector, wherein
the first posture information is generated before the detection of the disturbance of the specific projector, and
the second posture information is generated after the detection of the disturbance of the specific projector; and
a presenting position update section configured to:
compare the first posture information and the second posture information;
determine a change between the first posture information and the second posture information based on the comparison; and
update a first presenting position of the specific projector based on the determined change between the first posture information and the second posture information,
wherein the first presenting position is a position of the specific projector after the disturbance of the specific projector.

2. The image processing apparatus according to claim 1, further comprising an image-capturing section configured to:
capture the projection image projected from the specific projector, and
generate the captured image.

3. The image processing apparatus according to claim 1, wherein
the disturbance detection section is further configured to detect disturbances of a plurality of projectors,
the specific projector is different from the plurality of projectors, and
the presenting position update section is further configured to:
determine that third posture information of the plurality of projectors is one of same as fourth posture information of the plurality of projectors or different from the fourth posture information of the plurality of projectors, wherein
the third posture information is generated after the detection of the disturbances of the plurality of projectors, and
the fourth posture information is generated before the detection of the disturbances of the plurality of projectors;
determine a change between the first presenting position of the specific projector and a second presenting position of the specific projector,
wherein the second presenting position is a position of the specific projector before the disturbance of the specific projector; and
update the first presenting position of only the specific projector when
the third posture information of the plurality of projectors is determined to be same as the fourth posture information of the plurality of projectors, and
the determined change between the first presenting position and the second presenting position is smaller than a threshold change.

4. The image processing apparatus according to claim 1, further comprising a scene change determination section configured to determine one of a presence of a scene change in an input video or an absence of the scene change in the input video,
wherein when the presence of the scene change is determined, the presenting position update section is further configured to update the first presenting position of the specific projector around a time of the scene change in the input video.

5. The image processing apparatus according to claim 4, wherein
the disturbance detection section is further configured to detect disturbances of a plurality of projectors,
the presenting position update section is further configured to:
determine that third posture information of the plurality of projectors is one of same as fourth posture information of the plurality of projectors or different from the fourth posture information of the plurality of projectors, wherein
  the third posture information is generated after the detection of the disturbances of the plurality of projectors, and
  the fourth posture information is generated before the detection of the disturbances of the plurality of projectors; and
 determine a change between the first presenting position of the specific projector and a second presenting position of the specific projector, wherein the second presenting position is a position of the specific projector before the disturbance of the specific projector, and
the scene change determination section is further configured to determine one of the presence of the scene change in the input video or the absence of the scene change in the input video when one of
  the fourth posture information of the plurality of projectors is determined as different from the third posture information of the plurality of projectors, or
  the fourth posture information of the plurality of projectors is determined to be same as the third posture information of the plurality of projectors, but the determined change between the first presenting position of the specific projector and the second presenting position of the specific projector is larger than a threshold change.

6. The image processing apparatus according to claim 4, wherein the presenting position update section is further configured to:
 determine that a change between the first presenting position of the specific projector and a second presenting position of the specific projector is one of a first change or a second change, when the presence of the scene change in the input video is determined, wherein
  the second presenting position is a position of the specific projector before the disturbance of the specific projector, and
  the first change is larger than a threshold change and the second change is smaller than the threshold change; and
 update the first presenting position of the specific projector by applying an effect before the scene change and after the scene change, when the determined change between the first presenting position of the specific projector and the second presenting position of the specific projector is the first change.

7. The image processing apparatus according to claim 6, wherein the presenting position update section is further configured to update the first presenting position of the specific projector at the time of the scene change, when the determined change between the first presenting position of the specific projector and the second presenting position of the specific projector is the second change.

8. The image processing apparatus according to claim 4, wherein when the absence of the scene change in the input video is determined, the presenting position update section is further configured to:
 notify a user to the update of the first presenting position of the specific projector; and
 update the first presenting position of the specific projector after the notification.

9. The image processing apparatus according to claim 1, wherein the presenting position update section is further configured to update the first presenting position of the specific projector by applying an effect in an input video.

10. The image processing apparatus according to claim 9, wherein the presenting position update section is further configured to:
 determine a degree of a change, between the first presenting position of the specific projector and a second presenting position of the specific projector, after the detection of the disturbance of the specific projector, wherein the second presenting position is a position of the specific projector before the disturbance of the specific projector; and
 the presenting position update section is further configured to update the first presenting position by application of the effect in the input video,
  wherein the effect is applied based on the degree of the change between the first presenting position of the specific projector and the second presenting position of the specific projector.

11. The image processing apparatus according to claim 1, wherein
 the disturbance detection section is further configured to detect disturbances of a plurality of projectors,
 the plurality of projectors includes the specific projector, and
 the disturbances of the plurality of projectors includes at least one of a change in an arrangement of at least one projector of the plurality of projectors, one of an increase in a number of projectors in the plurality of projectors or a decrease in the number of projectors in the plurality of projectors, a posture deviation in the at least one projector due to a physical contact to the at least one projector, or the posture deviation in the at least one projector due to a temperature characteristic of the at least one projector.

12. An image processing method, comprising:
 in an image processing apparatus:
 detecting a disturbance of a projector based on a captured image generated by capture of a projection image projected from the projector; and
 generating first posture information of the projector and second posture information of the projector, wherein
  the first posture information is generated before the detection of the disturbance of the projector, and
  the second posture information is generated after the detection of the disturbance of the projector;
 comparing the first posture information and the second posture information;
 determining a change between the first posture information and the second posture information based on the comparison; and
 updating a presenting position of the projector based on the determined change between the first posture information and the second posture information,
  wherein the presenting position is a position of the specific projector after the disturbance of the projector.

* * * * *